US008992801B2

(12) United States Patent
König et al.

(10) Patent No.: US 8,992,801 B2
(45) Date of Patent: *Mar. 31, 2015

(54) ELECTROACTIVE MATERIAL, AND USE THEREOF IN ANODES FOR LITHIUM-ION CELLS

(75) Inventors: Hannah Maria König, Mannheim (DE);
Kirill Bramnik, Jersey City, NJ (US);
Arno Lange, Bad Dürkheim (DE);
Phillip Hanefeld, Cranford, NJ (US)

(73) Assignee: BASF SE, Ludwigshafen (DE)

( * ) Notice: Subject to any disclaimer, the term of this patent is extended or adjusted under 35 U.S.C. 154(b) by 774 days.

This patent is subject to a terminal disclaimer.

(21) Appl. No.: 13/262,453

(22) PCT Filed: Apr. 1, 2010

(86) PCT No.: PCT/EP2010/054403
§ 371 (c)(1),
(2), (4) Date: Sep. 30, 2011

(87) PCT Pub. No.: WO2010/112580
PCT Pub. Date: Oct. 7, 2010

(65) Prior Publication Data
US 2012/0032109 A1    Feb. 9, 2012

(30) Foreign Application Priority Data

Apr. 3, 2009  (EP) .................................... 09157333

(51) Int. Cl.
| *H01B 1/04* | (2006.01) |
| *H01M 4/587* | (2010.01) |
| *H01M 4/131* | (2010.01) |
| *H01M 4/133* | (2010.01) |
| *H01M 4/1391* | (2010.01) |
| *H01M 4/1393* | (2010.01) |
| *H01M 4/36* | (2006.01) |
| *H01M 4/38* | (2006.01) |
| *H01M 4/48* | (2010.01) |
| *H01M 4/485* | (2010.01) |
| *H01M 10/0525* | (2010.01) |

(52) U.S. Cl.
CPC .............. *H01M 4/587* (2013.01); *H01M 4/131* (2013.01); *H01M 4/133* (2013.01); *H01M 4/1391* (2013.01); *H01M 4/1393* (2013.01); *H01M 4/362* (2013.01); *H01M 4/38* (2013.01); *H01M 4/48* (2013.01); *H01M 4/485* (2013.01); *H01M 10/0525* (2013.01); *Y02E 60/122* (2013.01)
USPC ..... 252/506; 252/502; 429/218.1; 429/231.8; 526/92

(58) Field of Classification Search
USPC ........ 252/502, 506; 429/231.8, 218.1; 526/92
See application file for complete search history.

(56) References Cited

U.S. PATENT DOCUMENTS

| 7,094,499 B1 | 8/2006 | Hung | |
| 2002/0164479 A1 | 11/2002 | Matsubara et al. | |
| 2002/0183437 A1* | 12/2002 | Mahmud et al. | ............... 524/493 |
| 2004/0115535 A1 | 6/2004 | Morita et al. | |
| 2010/0284882 A1 | 11/2010 | Koch et al. | |
| 2010/0294673 A1 | 11/2010 | Koch et al. | |
| 2011/0003189 A1* | 1/2011 | Hildebrandt et al. | ......... 429/129 |
| 2011/0046314 A1 | 2/2011 | Klipp et al. | |
| 2012/0091400 A1* | 4/2012 | Konig et al. | .................. 252/506 |
| 2012/0184702 A1* | 7/2012 | Lange et al. | ...................... 528/8 |

FOREIGN PATENT DOCUMENTS

| EP | 0 692 833 A1 | 1/1996 |
| EP | 1 032 062 A1 | 8/2000 |
| EP | 1 657 768 A1 | 5/2006 |
| WO | WO-2009/083082 A2 | 7/2009 |
| WO | WO-2009/083083 A1 | 7/2009 |
| WO | WO-2009/133082 A1 | 11/2009 |
| WO | WO-2010/112580 A1 | 10/2010 |
| WO | WO-2010/112581 A1 | 10/2010 |

OTHER PUBLICATIONS

Nanostructured Organic-Inorganic Composite Materials by Twin Polymerization of Hybrid Monomers, Spange et al., Adv. Mater. 2009, 21, 2111-2116.*
Journal of Materials Science Letters, Bd. 19, Nr. 1, Jan. 1, 2000, pp. 53-56.
I. Honma et al., Nano Lett., 9 (2009).
H.H. Kung et al., Chem. Mater., 21 (2009) pp. 6-8.
Journal of Power Sources, Bd. 90, Nr. 1, Sep. 1, 2000, pp. 70-75.
R.A. Huggins, Proceedings of the Electrochemical society 87-1, 1987, pp. 356-64).
International Search Report, PCT/EP2010/054403—mailed Jul. 2, 2010.
International Report on Patentability—PCT/EP2010/054403—Int'l Filing Date Apr. 1, 2010.

* cited by examiner

*Primary Examiner* — Mark Kopec
*Assistant Examiner* — Haidung Nguyen
(74) *Attorney, Agent, or Firm* — Drinker Biddle & Reath LLP (57) ABSTRACT

The present invention relates to a novel electroactive material which comprises a graphitic carbon phase C and a (semi) metal phase and/or a (semimetal) oxide phase ($MO_x$ phase) and also to the use of the electroactive material in anodes for lithium ion cells. The invention further relates to a process for producing such materials. The electroactive material comprises:

a) a carbon phase C;

b) at least one $MO_x$ phase, where M is a metal or semimetal, x is from 0 to <k/2, where k is the maximum valence of the metal or semimetal.

In the electroactive material of the invention, the carbon phase C and the $MO_x$ phase form essentially co-continuous phase domains, with the average distance between two neighboring domains of identical phases being not more than 10 nm, in particular not more than 5 nm and especially not more than 2 nm.

15 Claims, 3 Drawing Sheets

ELECTROACTIVE MATERIAL, AND USE THEREOF IN ANODES FOR LITHIUM-ION CELLS

CROSS-REFERENCE TO RELATED APPLICATIONS

This application is a national stage application (under 35 U.S.C. §371) of PCT/EP2010/054403, filed Apr. 1, 2010, which claims benefit of European application 09157333.7, filed Apr. 3, 2009, the contents of each of which are incorporated herein by reference in their entireties.

FIELD OF THE INVENTION

The present invention relates to a novel electroactive material which comprises a graphitic carbon phase C and a (semi)metal phase and/or a (semimetal) oxide phase ($MO_x$ phase) and also to the use of the electroactive material in anodes for lithium ion cells. The invention further relates to a process for producing such materials.

BACKGROUND

In an increasingly mobile society, portable electric appliances are playing an ever greater role. For this reason, batteries, in particular rechargeable batteries (known as secondary batteries or accumulators), have for many years been used in virtually all aspects of life. Secondary batteries now have to meet a complex requirement profile in terms of their electrical and mechanical properties. Thus, the electronics industry is demanding new, small, lightweight secondary cells or batteries having a high capacity and a high cycling stability in order to achieve a long life. Furthermore, the temperature sensitivity and the spontaneous discharge rate should be low in order to ensure high reliability and efficiency. A high measure of safety in use is required at the same time. Lithium ion secondary batteries having these properties are also of interest for, in particular, the automobile sector and could, for example, in future be used as power stores in electrically operated vehicles or hybrid vehicles. In addition, batteries which have advantageous electrokinetic properties are required here in order to be able to achieve high current densities. In the development of new types of battery systems, being able to produce rechargeable batteries in an inexpensive way is also of particular interest. Environmental aspects are also playing an increasing role in the development of new battery systems.

The anode of a modern high-energy lithium battery at present typically comprises graphite but can also be based on metallic lithium, a lithium alloy or lithium-metal oxides. The use of lithium-cobalt oxides has been found to be useful in recent years for construction of the cathode of a modern lithium battery. The two electrodes in a lithium battery are connected to one another using a liquid or solid electrolyte. During (re)charging of a lithium battery, the cathode material is oxidized (e.g. according to the equation: $LiCoO_2 \rightarrow n\, Li^+ + Li_{(1-n)}CoO_2 + ne^-$). In this way, the lithium is liberated from the cathode material and migrates in the form of lithium ions to the anode where the lithium ions are bound with reduction of the anode material; in the case of graphite, intercalated as lithium ions with reduction of the graphite. Here, the lithium occupies the sites between the layers in the graphite structure. On discharge of the battery, the lithium bound in the anode is released from the anode in the form of lithium ions and oxidation of the anode material takes place. The lithium ions migrate through the electrolyte to the cathode and are bound there with reduction of the cathode material. Both during discharge of the battery and during recharging of the battery, the lithium ions migrate through the separator.

However, a significant disadvantage of the use of graphite in Li ion batteries is the comparatively low specific capacity with a theoretical upper limit of 0.372 Ah/g. Graphite-like carbon materials other than graphite, for example carbon black such as acetylene black, lamp black, furnace black, flame black, cracking black, channel black or thermal black, and also glossy carbon or hard carbon, also have similar properties. In addition, such anode materials are not unproblematical in terms of their safety.

Higher specific capacities can be obtained when lithium alloys such as $Li_xSi$, $Li_xPb$, $Li_xSn$, $Li_xAl$ or $Li_xSb$ alloys are used. In this case charge capacities up to 10 times the charge capacity of graphite are possible ($Li_xSi$ alloy, see R. A. Huggins, Proceedings of the Electrochemical society 87-1, 1987, pp. 356-64). A significant disadvantage of such alloys is the dimensional change which they undergo during charging/discharge, which leads to disintegration of the anode material. The resulting increase in the specific surface area of the anode material results in capacity decreases due to irreversible reaction of the anode material with the electrolyte and increased sensitivity of the cell to heat, which in an extreme case can lead to strongly exothermic destruction of the cell and is a safety risk.

The use of lithium as electrode material is problematical for safety reasons. In particular, the deposition of lithium during charging results in formation of lithium dendrites on the anode material. These can lead to a short circuit in the cell and can in this way bring about uncontrolled destruction of the cell.

EP 692 833 describes a carbon-comprising insertion compound which comprises carbon together with a metal or semimetal which forms alloys with lithium, especially silicon. The compound is prepared by pyrolysis of polymers comprising the metal or semimetal and hydrocarbon groups, e.g. in the case of silicon-comprising insertion compounds, by pyrolysis of polysiloxanes. The pyrolysis requires drastic conditions under which the primary polymers are firstly decomposed and carbon and (semi)metal and/or (semi)metal oxide domains are subsequently formed. The preparation of such materials generally leads to poorly reproducible qualities, presumably because the domain structure is impossible or difficult to control due to the high energy input.

H. Tamai et al, J. Materials Science Letters, 19 (2000) pp. 53-56, propose silicon-doped carbon-comprising materials which are obtained by pyrolysis of pitch in the presence of polysiloxanes as anode material for Li ion batteries. For the abovementioned reasons, these materials have disadvantages comparable to those of the materials known from EP 692 833.

US 2002/0164479 describes a particulate carbon-comprising material as anode material for Li ion secondary cells, where the particles of the carbon-comprising material comprise graphite particles on whose surface a plurality of "complex particles" are located and enveloped by an amorphous carbon layer. The complex particles are in turn made up of a particulate, crystalline silicon phase, particles of conductive carbon located thereon and a carbon envelope. The complex particles have particle sizes in the range from 50 nm to 2 µm and the graphite particles have particle sizes in the range from 2 to 70 µm. To produce the materials, complex particles are firstly produced by carbonization of a mixture of phenolic resin, silicon particles and conductive carbon black and these are subsequently mixed with particulate graphite and further phenolic resin and carbonized. Not least because of the double carbonization, the production of these materials is comparatively complicated and leads to poorly reproducible results.

US 2004/0115535 describes a particulate carbon material as anode material in Li ion secondary batteries, in which silicon particles having dimensions of less than 100 nm are dispersed together with $SiO_2$ particles in particles of a continuous carbon phase. To produce such materials, a mixture of $SiO_x$ particles ($0.8 \leq x \leq 1.5$), carbon particles and a carbonizable substance is carbonized at elevated temperature. The use of $SiO_x$ particles makes the process complicated.

H. H. Kung et al., Chem. Mater., 21 (2009) pp. 6-8, describe silicon nanoparticles which have particle sizes of <30 nm and are embedded in a porous carbon matrix which is bound covalently and to the silicon particles and their suitability as elektroactive anode materials in Li ion batteries. They are produced by reaction of hydrogen-terminated silicon nanoparticles with allylphenol in a hydrosilylation reaction, subsequent reaction of the hydrosilylated particles with formaldehyde and resorcinol to form a formaldehyde resin which is covalently bound to the nanoparticles and carbonization of the material obtained. Not least because of the use of H-terminated Si nanoparticles and the hydrosilylation, the production of these materials is comparatively complicated and expensive. In addition, this process leads to poorly reproducible results, presumably because the reaction leads to incomplete and variable conversions due to the disadvantages inherent in a surface reaction, e.g. steric hindrance and diffusion phenomena.

I. Honma et al., Nano Lett., 9 (2009), describe nanoporous materials which are made up of $SnO_2$ nanoparticles embedded between exfoliated graphite layers. These materials are suitable as anode materials for Li ion batteries. They are produced by mixing exfoliated graphite layers with $SnO_2$ nanoparticles in ethylene glycol. The exfoliated graphite layers were in turn produced by reduction of oxidized and exfoliated graphite. This process, too, is comparatively complicated and suffers in principle from similar problems as the process described by H. H. Kung et al.

In summary, it may be said that the carbon-based or lithium alloy-based anode materials which have hitherto been known from the prior art are unsatisfactory in respect of the specific capacity, the charging/discharge kinetics and/or the cycling stability, e.g. decrease in the capacity and/or high or increasing impedance after a plurality of charging/discharge cycles. The composite materials having a particulate semimetal or metal phase and one or more carbon phases which have recently been proposed in order to solve these problems are able to solve these problems only partly, with the quality of such composite materials generally not being reproducible. In addition, production of these materials is generally so complicated that economical use is not possible.

BRIEF SUMMARY

It is an object of the present invention to provide an electroactive material which is suitable as anode material for Li ion batteries, in particular for Li ion secondary batteries, and overcomes the disadvantages of the prior art. The electroactive material should, in particular, have at least one and especially more than one of the following properties:
  a high specific capacity,
  a high cycling stability,
  low spontaneous discharge,
  a good mechanical stability.

In addition, the materials should be able to be produced economically and especially in a reproducible quality.

It has been found that these objects are surprisingly achieved by an electroactive material having the following properties. The electroactive material comprises:
a) a carbon phase C;
b) at least one $MO_x$ phase, where M is a metal or semimetal, x is from 0 to <k/2, where k is the maximum valence of the metal or semimetal.

In the electroactive material of the invention, the carbon phase C and the $MO_x$ phase form essentially co-continuous phase domains, with the average distance between two neighboring domains of identical phases being not more than 10 nm, in particular not more than 5 nm and especially not more than 2 nm.

The invention thus provides an electroactive material having the properties indicated here and in the following.

DETAILED DESCRIPTION OF THE PREFERRED EMBODIMENTS

Owing to its composition and the specific arrangement of the carbon phase C and the $MO_x$ phase, the material of the invention is particularly suitable as electroactive material for anodes in Li ion cells, in particular in Li ion secondary cells or batteries. In particular, when used in anodes of Li ion cells and especially of Li ion secondary cells, it has a high capacity and a good cycling stability and ensures low impedances in the cells. Furthermore, it has a high mechanical stability, presumably because of the co-continuous phase arrangement. In addition, it can be produced simply and with reproducible quality.

The invention therefore also provides for the use of the electroactive material in anodes for lithium ion cells, in particular lithium ion secondary cells, and provides an anode for lithium ion cells, in particular lithium ion secondary cells, which comprises an electroactive material according to the invention and also a lithium ion cell, in particular a lithium ion secondary cell, which has at least one anode comprising an electroactive material according to the invention.

The materials of the invention can be produced in a particularly simple way by a twin polymerization process followed by carbonization, without complicated functionalization of nanoparticles or multiple carbonization being required. The invention therefore also provides a process for producing the electroactive materials.

According to the invention, the electroactive material comprises a carbon phase C. In this phase, the carbon is present in essentially elemental form, i.e. the proportion of atoms other than carbon, e.g. N, O, S, P and/or H, in the phase is less than 10% by weight, in particular less than 5% by weight, based on the total amount of carbon in the phase. The content of atoms other than carbon in the phase can be determined by means of X-ray photoelectron spectroscopy. Apart from carbon, the carbon phase can, as a result of the production method, comprise, in particular, small amounts of nitrogen, oxygen and/or hydrogen. The molar ratio of hydrogen to carbon will generally not exceed a value of 1:2, in particular a value of 1:3 and especially a value of 1:4. The value can also be 0 or virtually 0, e.g. ≤0.1.

In the carbon phase C, the carbon is presumably predominantly present in graphitic or amorphous form, as can be concluded from the characteristic bond energy (284.5 eV) and the characteristically asymmetric signal shape in ESCA studies. For the purposes of the present invention, carbon in graphitic form means that the carbon is present at least partly in a hexagonal layer arrangement typical of graphite, with the layers also being able to be curved or exfoliated.

According to the invention, the electroactive material comprises a phase having the stoichiometry $MO_x$, i.e. a phase which consists essentially of a metal or semimetal M which is present in oxidic and/or elemental form. This phase will therefore hereinafter also be referred to as $MO_x$ phase. In general, the metal or semimetal M is selected from among metals which can form an alloy with lithium, and mixtures of these metals. Examples are the metals and semimetals of the 3rd main group of the Periodic Table (group 3 in the IUPAC table), in particular aluminum, the semimetals and metals of the 4th main group of the Periodic Table (group 14 in the IUPAC table), in particular silicon and tin, the metals of the 4th transition group of the Periodic Table (group 4 in the IUPAC table), in particular zirconium and titanium, and the semimetals of the 5th main group of the Periodic Table (group 15 in the IUPAC table), in particular antimony. Among these, preference is given to silicon and titanium. In particular, these metals make up 90% by weight of the atoms other than oxygen in the $MO_x$ phase. In particular, at least 90 mol %, in particular at least 95 mol %, of the atoms M in the $MO_x$ phase are silicon atoms. Apart from the metal or semimetal, the $MO_x$ phase can comprise oxygen, with the maximum possible amount of oxygen atoms being determined by the maximum valence of the metal or semimetal. Accordingly, the value of x is not more than half the valence of the metal or semimetal, that is not more than k/2. Oxygen, if present, is preferably present in a substoichiometric amount, i.e. the value of x is less than k/2, and is in particular not more than k/4. Preference is given to x being from 0 to 2, in particular from 0 to 1.

In the electroactive materials of the invention, the molar ratio of (semi)metal atoms M to carbon atoms C, i.e. the molar ratio M:C, can vary over a wide range and is preferably in the range from 1:30 to 2:1, in particular in the range from 1:16 to 1:1.

In the electroactive materials of the invention, the carbon phase C and the $MO_x$ phase are present in a co-continuous arrangement over a wide range, i.e. the respective phase forms essentially no isolated phase domains which are surrounded by an optionally continuous phase domain. Rather, the two phases form physically separate continuous phase domains which intermesh, as can be seen from examination of the materials by means of transmission electron microscopy. Regarding the terms continuous phase domains, discontinuous phase domains and co-continuous phase domains, reference may also be made to W. J. Work et al. Definitions of Terms Related to Polymer Blends, Composites and Multiphase Polymeric materials, (IUPAC Recommendations 2004), Pure Appl. Chem., 76 (2004), pp. 1985-2007, in particular p. 2003. According to this, a co-continuous arrangement of a two-component mixture is a phase-separated arrangement of the two phases or components, in which all regions of the phase boundary area of the domain within one domain of the respective phase can be connected by a continuous path without the path going through/crossing a phase boundary area.

In the electroactive materials of the invention, the regions in which the carbon phase and the $MO_x$ phase form essentially co-continuous phase domains make up at least 80% by volume, in particular 90% by volume, of the electroactive material.

In the electroactive materials of the invention, the distances between neighboring phase boundaries, or the distances between the domains of neighboring identical phases, are small and are on average not more than 10 nm, in particular not more than 5 nm and especially not more than 2 nm. For the purposes of the present invention, the distance between neighboring identical phases is, for example, the distance between two domains of the $MO_x$ phase which are separated from one another by a domain of the carbon phase C, or the distance between two domains of the carbon phase C which are separated from one another by a domain of the $MO_x$ phase. The average distances between the domains of neighboring identical phases can be determined by means of the scattering vector q in small angle X-ray scattering (SAXS) (measurement in transmission at 20° C., monochromated $CuK_\alpha$ radiation, 2D detector (image plate), slit collimation).

The size of the phase regions and thus the distances between neighboring phase boundaries and the arrangement of the phase can also be determined by transmission electron microscopy, in particular by means of the HAADF-STEM technique (HAADF-STEM: high angle annular darkfield scanning electron microscopy). In this imaging technique, comparatively heavy elements (e.g. Si compared to C) appear lighter in color than lighter elements. Preparation artifacts can likewise be observed since denser regions of the preparations appear lighter in color than less dense regions.

The electroactive materials of the invention are produced by a process which comprises a twin polymerization in a first step and carbonization, i.e. calcination with substantial or complete exclusion of oxygen, of the organic polymer obtained in the twin polymerization in a second step.

For the purposes of the present invention, a twin polymerization is the polymerization of a monomer which
 comprises a first monomer unit which comprises a metal or semimetal which forms oxides and
 comprises a second organic monomer unit which is bound to the first monomer unit via one or more chemical bonds, in particular via one or more covalent bonds.

The polymerization conditions of a twin polymerization are selected so that in the polymerization of the monomer the first monomer unit and the second monomer unit polymerize synchronously, with the first monomer unit forming a first, generally oxidic, polymeric material comprising the metal or semimetal and the second monomer unit at the same time forms an organic polymer made up of the second monomer units. The term "synchronously" does not necessarily mean that the polymerizations of the first monomer unit and the second monomer unit proceed at the same rate. Rather, "synchronously" means that the polymerizations of the first monomer unit and the second monomer unit are coupled kinetically and can be initiated by the same polymerization conditions.

Under the polymerization conditions, a partial or complete phase separation into a first phase formed by the first polymeric material and a second phase formed by the organic polymer (second polymeric material) made up of the second monomer units occurs. In this way, a composite material composed of the first polymeric material and the second polymeric material is obtained. The synchronous polymerization results in formation of very small phase regions of the first polymeric material and the second polymeric material whose dimensions are in the region of few nanometers, with the phase domains of the first polymeric material and the phase domains of the second polymeric material having a co-continuous arrangement. The distances between neighboring phase boundaries or the distances between the domains of neighboring identical phases are extremely small and are on average not more than 10 nm, in particular not more than 5 nm and especially not more than 2 nm. A macroscopically visible separation into discontinuous domains of the respective phase does not occur. Surprisingly, the co-continuous arrangement of the phase domains and also the small dimensions of the phase domains are likewise retained during subsequent calcination.

Twin polymerization is known in principle and was described for the first time by S. Spange et al., Angew. Chem. Int. Ed., 46 (2007) 628-632 for the cationic polymerization of tetrafurfuryloxysilane to form polyfurfuryl alcohol and silicon dioxide and also for the cationic polymerization of difurfuryloxydimethylsilane to form polyfurfuryl alcohol and polydimethylsiloxane. In addition, PCT/EP 2008/010168 [WO 2009/083082] and PCT/EP 2008/010169 [WO 2009/083083] describe a twin polymerization of optionally substituted 2,2'-spiro[4H-1,3,2-benzodioxasilin] (hereinafter referred to as SPISI). The relevant disclosure in PCT/EP 2008/010168 [WO 2009/083082] and in PCT/EP2008/010169 [WO 2009/083083] is hereby fully incorporated by reference.

Monomers which are suitable for the twin polymerization are known from the prior art or can be prepared by methods analogous to those described there. At this point, reference may be made by way of example to the literature cited at the outset and also to the following literature references:
silylenol ethers (Chem. Ber. 119, 3394 (1986); J. Organomet. Chem. 244 381 (1981); JACS 112, 6965 (1990))
cycloboroxanes (Bull. Chem. Soc. Jap. 51, 524 (1978); Can. J. Chem. 67, 1384 (1989); J. Organomet. Chem. 590, 52 (1999))
cyclosilicates and cyclogermanates (Chemistry of Heterocyclic Compounds, 42, 1518, (2006); Eur. J. Inorg. Chem. (2002), 1025; J. Organomet. Chem. 1, 93 (1963); J. Organomet. Chem. 212, 301 (1981); J. Org. Chem. 34, 2496 (1968); Tetrahedron 57, 3997 (2001) and the earlier international patent applications WO 2009/083082 and WO 2009/083083)
cyclostannanes (J. Organomet. Chem. 1, 328 (1963))
cyclozirconates (JACS 82, 3495 (1960))

The monomers which are suitable for producing the materials of the invention can be described in particular by the general formula I:

where
M is a metal or semimetal, in particular a metal or semimetal of group 3, 4, 14 or 15 of the Periodic Table, which is preferably selected from among B, Al, Si, Ti, Zr, Hf, Ge, Sn, Pb, As, Sb and Bi, in particular from among B, Al, Si, Ti, Zr, Sn and Sb, with M particularly preferably being Si;
$R^1$, $R^2$ can be identical or different and are each a radical Ar—C($R^a$,$R^b$)—, where Ar is an aromatic or heteroaromatic radical which optionally has 1 or 2 substituents selected from among halogen, CN, $C_1$-$C_6$-alkyl, $C_1$-$C_6$-alkoxy and phenyl and $R^a$, $R^b$ are each, independently of one another, hydrogen or methyl or together are an oxygen atom or a methylidene group (=$CH_2$),
or the radicals $R^1$ and $R^2$ together with the oxygen atom or the group Q to which they are bound form a radical of the formula A where # denotes the linkage to M, A is an aromatic or heteroaromatic ring fused to the double bond, m is 0, 1 or 2, the radicals R can be identical or different and are selected from among halogen, CN, $C_1$-$C_6$-alkyl, $C_1$-$C_6$-alkoxy and phenyl and $R^a$, $R^b$ are as defined above,
X, Y can be identical or different and are each oxygen, sulfur, NH or a chemical bond,
q is 0, 1 or 2 corresponding to the valence of M,
Q is oxygen, sulfur or NH, in particular oxygen;
$R^{1'}$, $R^{2'}$ can be identical or different and are each $C_1$-$C_6$-alkyl, $C_3$-$C_6$-cycloalkyl, aryl or a radical Ar'—C($R^{a'}$,$R^{b'}$)—, where Ar' has the meanings given for Ar and $R^{a'}$, $R^{b'}$ have the meanings given for $R^a$, $R^b$ or in the case of q=1, $R^{1'}$, $R^{2'}$ together with X and Y can form a radical of the formula A as defined above.

Also suitable for producing the materials of the invention are monomers of the formula I in which M, $R^1$, $R^2$, Q, q, Y and $R^{2'}$ are as defined above and the radical $R^{1'}$ is a radical of the formula:

where q, $R^1$, $R^2$, $R^{2'}$, Y and Q are as defined above, X" has one of the meanings given for Q and is in particular oxygen and # represents the bond to M. Among these, preference is given to monomers in which M, $R^1$, $R^2$, Q, q, Y and $R^{2'}$ have the meanings indicated as preferred, in particular monomers in which the radicals $R^1$Q and $R^2$G together form a radical of the formula A.

The present invention therefore also provides a process for producing an electroactive material which comprises
a) a carbon phase C as defined above; and
b) at least one $MO_x$ phase as defined above, where M is a metal or semimetal, in particular B, Al, Si, Ti, Zr, Sn or Sb and especially Si, x is from 0 to <k/2, in particular from 0 to 2 and especially from 0 to 1, where k is the maximum valence of the metal or semimetal;
wherein the process comprises the following steps:
i) polymerization of at least one monomer of the formula I as defined above in a nonaqueous polymerization medium and
ii) calcination of the resulting polymer with substantial or complete exclusion of oxygen.

The present invention therefore also provides an electroactive material which comprises a) a carbon phase C as defined above; and
b) at least one $MO_x$ phase as defined above, where M is a metal or semimetal, in particular B, Al, Si, Ti, Zr, Sn or Sb and especially Si, x is from 0 to <k/2, in particular from 0 to 2 and especially from 0 to 1, where k is the maximum valence of the metal or semimetal;

and can be obtained by the process of the invention.

For the purposes of the invention, an aromatic radical is a carbocyclic aromatic hydrocarbon radical such as phenyl or naphthyl.

For the purposes of the invention, a heteroaromatic radical is a heterocyclic aromatic radical which generally has 5 or 6 ring members, with one of the ring members being a heteroatom selected from among nitrogen, oxygen and sulfur, and optionally 1 or 2 further ring members can be a nitrogen atom and the remaining ring members are carbon. Examples of heteroaromatic radicals are furyl, thienyl, pyrrolyl, pyrazolyl, imidazolyl, oxazolyl, isoxazolyl, pyridyl and thiazolyl.

For the purposes of the invention, a fused aromatic radical or ring is a carbocyclic aromatic, divalent hydrocarbon radical such as o-phenylene (benzo) or 1,2-naphthylene (naphtho).

For the purposes of the invention, a fused heteroaromatic radical or ring is a heterocyclic aromatic radical as defined above in which two adjacent carbon atoms form the double bond shown in formula A or in the formulae II and III.

In a first embodiment of the monomers of the formula I, the groups $R^1O$ and $R^2O$ together form a radical of the formula A as defined above, in particular a radical of the formula Aa:

(Aa)

where #, m, Q, R, $R^a$ and $R^b$ are as defined above. In the formulae A and Aa, the variable m is in particular 0. Q is in particular oxygen. When m is 1 or 2, R is in particular a methyl or methoxy group. In the formulae A and Aa, $R^a$ and $R^b$ are, in particular hydrogen.

Among the monomers of the first embodiment, particular preference is given to monomers of the formula I in which q=1 and the groups $X$—$R^{1'}$ and $Y$—$R^{2'}$ together form a radical of the formula A, in particular a radical of the formula Aa. Such monomers can be described by the formulae II and IIa below:

(II)

(IIa)

Among the monomers of the first embodiment, preference is also given to monomers of the formula I in which q is 0 or 1 and the group $X$—$R^{1'}$ is a radical of the formula A' or Aa':

(A')

(A')

where m, A, R, $R^a$, $R^b$, G, Q, X", Y, $R^{2'}$ and q have the abovementioned meanings, in particular the meanings indicated as preferred.

Such monomers can be described by the formulae II' and IIa' below:

(II')

(IIa')

In the formulae II and II', the variables have the following meanings:

M is a metal or semimetal, preferably a metal or semimetal of the 3rd or 4th main group or of the 4th or 5th transition group of the Periodic Table, in particular B, Al, Si, Ti, Zr, Hf, Ge, Sn, Pb, V, As, Sb or Bi, particularly preferably Si, Ti, Zr or Sn, especially Si;

A, A' are each, independently of one another, an aromatic or heteroaromatic ring fused onto the double bond;

m, n are each, independently of one another, 0, 1 or 2, in particular O;

Q, Q' are each, independently of one another, O, S or NH, in particular O or NH and especially O;

R, R' are selected independently from among halogen, CN, $C_1$-$C_6$-alkyl, $C_1$-$C_6$-alkoxy and phenyl and are in particular methyl or methoxy;

$R^a$, $R^b$, $R^{a'}$, $R^{b'}$ are selected independently from among hydrogen and methyl or $R^a$ and $R^b$ and/or $R^{a'}$ and $R^{b'}$ in each case together represent an oxygen atom or =$CH_2$; in particular, $R^a$, $R^b$, $R^{a'}$, $R^{b'}$ are each hydrogen;

L is a group $(Y-R^{2'})_q$, where Y, $R^{2'}$ and q are as defined above; in particular q is 0; and X" has one of the meanings given for Q and is in particular oxygen.

In formula IIa, the variables have the following meanings:

M is a metal or semimetal, preferably a metal or semimetal of the 3rd or 4th main group or of the 4th or 5th transition group of the Periodic Table, in particular B, Al, Si, Ti, Zr, Hf, Ge, Sn, Pb, V, As, Sb or Bi, particularly preferably Si, Ti, Zr or Sn, especially Si;

m, n are each, independently of one another, 0, 1 or 2, in particular 0;

Q, Q' are each, independently of one another, O, S or NH, in particular O or NH and especially O;

R, R' are selected independently from among halogen, CN, $C_1$-$C_6$-alkyl, $C_1$-$C_6$-alkoxy and phenyl and are in particular methyl or methoxy;

$R^a$, $R^b$, $R^{a'}$, $R^{b'}$ are selected independently from among hydrogen and methyl or $R^a$ and $R^b$ and/or $R^{a'}$ and $R^{b'}$ in each case together represent an oxygen atom or =$CH_2$; in particular, $R^a$, $R^b$, $R^{a'}$, $R^{b'}$ are each hydrogen;

L is a group $(Y-R^{2'})_q$, where Y, $R^{2'}$ and q are as defined above and q is in particular 0.

An example of a monomer of the formula II or IIa is 2,2'-spirobis[4H-1,3,2-benzodioxasilin] (compound of the formula IIa in which M=Si, m=n=0, G=O, $R^a$=$R^b$=$R^{a'}$=$R^{b'}$=hydrogen). Such monomers are known from the earlier international patent applications WO2009/083082 and PCT/EP 2008/010169 [WO2009/083083] or can be prepared by the methods described there. A further example of a monomer IIa is 2,2-spirobi[4H-1,3,2-benzodioxaborin] (Bull. Chem. Soc. Jap. 51 (1978) 524): (compound of the formula IIa where M=B, m=n=0, G=O, $R^a$=$R^b$=$R^{a'}$=$R^{b'}$=hydrogen). A further example of a monomer IIa' is a Bis(4H-1,3,2-benzodioxaborin-2-yl)oxide ((compound of the formula IIa' where M=B, m=n=0, L absent (q=0), G=O, $R^a$=$R^b$=$R^{a'}$=$R^{b'}$=hydrogen; Bull. Chem. Soc. Jap. 51 (1978) 524).

In the monomers II and IIa, the unit MQQ' or $MO_2$ forms the polymerizable unit A, while the remaining parts of the monomer II or IIa, i.e. the groups of the formula A or Aa minus the atoms Q or Q' (or minus the oxygen atom in Aa), form the polymerizable units B.

Among the monomers of the first embodiment, preference is also given to monomers of the formula I in which the groups X—$R^{1'}$ and Y—$R^{2'}$ are identical or different and are selected from among $C_1$-$C_6$-alkyl, $C_3$-$C_6$-cycloalkyl and aryl, e.g. phenyl, i.e. X and Y represent a chemical bond. Such monomers can be described by the formulae III and IIIa below:

(III)

(IIIa)

In formula III, the variables have the following meanings:

M is a metal or semimetal, preferably a metal or semimetal of the 3rd or 4th main group or of the 4th or 5th transition group of the Periodic Table, in particular B, Al, Si, Ti, Zr, Hf, Ge, Sn, Pb, V, As, Sb or Bi, particularly preferably Si, Ti, Zr or Sn, especially Si;

A is an aromatic or heteroaromatic ring fused to the double bond;

m is 0, 1 or 2, in particular 0;

q is, corresponding to the valence and charge of M, either 0, 1 or 2;

Q is O, S or NH, in particular O or NH and especially O;

the radicals R are selected independently from among halogen, CN, $C_1$-$C_6$-alkyl, $C_1$-$C_6$-alkoxy and phenyl and are each in particular methyl or methoxy;

$R^a$, $R^b$ are selected independently from among hydrogen and methyl or $R^a$ and $R^b$ together represent an oxygen atom or =$CH_2$ s and are in particular each hydrogen;

$R^c$, $R^d$ are identical or different and are selected from among $C_1$-$C_6$-alkyl, $C_3$-$C_6$-cycloalkyl and aryl and are in particular methyl.

In formula IIIa, the variables have the following meanings:

M is a metal or semimetal, preferably a metal or semimetal of the 3rd or 4th main group or of the 4th or 5th transition group of the Periodic Table, in particular B, Al, Si, Ti, Zr, Hf, Ge, Sn, Pb, V, As, Sb or Bi, particularly preferably Si, Ti, Zr or Sn, especially Si;

m is 0, 1 or 2, in particular 0;

q is, corresponding to the valence and charge of M, either 0, 1 or 2;

Q is O, S or NH, in particular O or NH and especially O;

the radicals R are selected independently from among halogen, CN, $C_1$-$C_6$-alkyl, $C_1$-$C_6$-alkoxy and phenyl and are each in particular methyl or methoxy;

$R^a$, $R^b$ are selected independently from among hydrogen and methyl or together represent an oxygen atom or =$CH_2$, and are in particular each hydrogen;

$R^c$, $R^d$ are identical or different and are selected from among $C_1$-$C_6$-alkyl, $C_3$-$C_6$-cycloalkyl and aryl and are in particular methyl.

Examples of monomers of the formula III or IIIa are 2,2-dimethyl-4H-1,3,2-benzodioxasilin (compound of the formula IIIa in which M=Si, q=1, m=0, G=O, $R^a$=$R^b$=hydrogen, $R^c$=$R^d$=methyl), 2,2-dimethyl-4H-1,3,2-benzooxazasilin (compound of the formula IIIa in which M=Si, q=1, m=0, G=NH, $R^a$=$R^b$=hydrogen, $R^c$=$R^d$=methyl), 2,2-dimethyl-4-oxo-1,3,2-benzodioxasilin (compound of the formula IIIa in which M=Si, q=1, m=0, G=O, $R^a$+$R^b$=O, $R^c$=$R^d$=methyl) and 2,2-dimethyl-4-oxo-1,3,2-benzoxazasilin (compound of the formula IIIa in which M=Si, q=1, m=0, G=NH, $R^a$+$R^b$=O, $R^c$=$R^d$=methyl). Such monomers are known, for example, from Wieber et al. Journal of Organometallic Chemistry, 1, 1963, 93, 94. Further examples of monomers IIIa are 2,2-diphenyl[4H-1,3,2-benzodioxasilin] (J. Organomet. Chem. 71 (1974) 225); 2,2-di-n-butyl[4H-1,3,2-benzodioxastannin] (Bull. Soc. Chim. Belg. 97 (1988) 873); 2,2-dimethyl[4-methylidene-1,3,2- benzodioxasilin] (J. Organomet. Chem., 244, C5-C8 (1983));
2-methyl-2-vinyl[4-oxo-1,3,2-benzodioxazasilin].

In a second embodiment of the monomers of the formula I, $R^1$ and $R^2$ are each a group $Ar-C(R^a,R^b)$ and preferably a group $Ar-CH_2$ ($R^a=R^b$=hydrogen), where Ar is as defined above and is in particular selected from among furyl, thienyl, pyrrolyl and phenyl, with the four rings mentioned being unsubstituted or having one or two substituents selected from among halogen, CN, $C_1$-$C_6$-alkyl, $C_1$-$C_6$-alkoxy and phenyl.

In particular, Ar is furyl which optionally has one or two substituents selected from among halogen, CN, $C_1$-$C_6$-alkyl, $C_1$-$C_6$-alkoxy and phenyl and is in particular unsubstituted. Here, $R^1$ and $R^2$ can be different.

The monomers of the second embodiment can be described by the general formula IV:

(IV)

where M, q, Ar, X, Y, $R^{1'}$, $R^{2'}$, $R^a$ and $R^b$ are as defined above, Ar' has one of the meanings given for Ar and $R^{a'}$ and $R^{b'}$ are each, independently of one another, hydrogen or methyl. In formula IV, M is in particular a metal or semimetal of group 3, 4, 14 or 15 of the Periodic Table, preferably B, Al, Si, Ti, Zr, Sn or Sb and especially Si. The variable q is in particular 1. In formula IV, $R^a$ and $R^b$ and also $R^{a'}$ and $R^{b'}$ are in particular hydrogen. In formula IV, Ar and Ar' can be identical or different and are in particular selected from among furyl, thienyl, pyrrolyl and phenyl, where the four rings mentioned are unsubstituted or have one or two substituents selected from among halogen, CN, $C_1$-$C_6$-alkyl, $C_1$-$C_6$-alkoxy and phenyl. In particular, Ar and Ar' are furyl which optionally has one or two substituents selected from among halogen, CN, $C_1$-$C_6$-alkyl, $C_1$-$C_6$-alkoxy and phenyl and is in particular unsubstituted.

Among the monomers of the second embodiment, particular preference is given to monomers of the formula IV in which q=0, 1 or 2, in particular q=1, and the groups $X-R^{1'}$ and $Y-R^{2'}$ are identical or different and are each a group $Ar-C(R^a,R^b)$ and preferably a group $Ar-CH_2$ ($R^a=R^b$=hydrogen), where Ar is as defined above and is in particular selected from among furyl, thienyl, pyrrolyl and phenyl, where the four rings mentioned are unsubstituted or have one or two substituents selected from among halogen, CN, $C_1$-$C_6$-alkyl, $C_1$-$C_6$-alkoxy and phenyl. Such monomers can be described by the formulae V and Va:

(V)

(Va)

where M, k, Ar, $R^a$ and $R^b$ are as defined above, Ar' has one of the meanings given for Ar, $R^{a'}$ and $R^{b'}$ are each hydrogen or methyl and especially hydrogen. In the formulae V and Va, M is in particular a metal or semimetal of group 3, 4, 14 or 15 of the Periodic Table, preferably B, Al, Si, Ti, Zr, Sn or Sb and especially Si. In the formulae V and Va, q is in particular 1. In formula V, Ar and Ar' are identical or different and are preferably selected from among furyl, thienyl, pyrrolyl and phenyl, where the four rings mentioned are unsubstituted or have one or two substituents selected from among halogen, CN, $C_1$-$C_6$-alkyl, $C_1$-$C_6$-alkoxy and phenyl. In particular, Ar and Ar' are furyl which optionally has one or two substituents selected from among halogen, CN, $C_1$-$C_6$-alkyl, $C_1$-$C_6$-alkoxy and phenyl and is in particular unsubstituted (formula Va). In formula Va, m is 0, 1 or 2 and in particular 0 and R is selected from among halogen, CN, $C_1$-$C_6$-alkyl, $C_1$-$C_6$-alkoxy and phenyl and especially from among methyl and methoxy. An example of a monomer of the formula V or Va is tetrafurfuryloxysilane (compound of the formula Va in which M=Si, q=1, m=0, $R^a=R^b$=hydrogen). A further example of the monomer V or Va is tetrafurfuryl orthotitanate: Adv. Mater. 2008, 20, 4113. This compound tetramerizes to (µ4-oxido)hexakis(m-furfuryloxo)octakis(furfuryloxo)tetra-titanium, which is used as twin monomer. A further example of the monomer V or Va is trifurfuryloxyborane. Such monomers are known from the prior art, e.g. from the abovementioned article by Spange et al. and the references cited therein, or can be prepared in an analogous way.

Among the monomers of the second embodiment, preference is also given to monomers of the formula IV in which the groups $X-R^{1'}$ and $Y-R^{2'}$ are identical or different and are selected from among $C_1$-$C_6$-alkyl, $C_3$-$C_6$-cycloalkyl and aryl, e.g. phenyl, i.e. X and Y each represent a chemical bond. Such monomers can be described by the formulae VI and VIa below:

(VI)

(VIa)

In the formulae VI and VIa, M is in particular a metal or semimetal of group 3, 4, 14 or 15 of the Periodic Table, preferably B, Al, Si, Ti, Zr, Sn or Sb and especially Si. The variable q is in particular 1. In formula VI, Ar and Ar' are identical or different and are preferably selected from among furyl, thienyl, pyrrolyl and phenyl, where the four rings mentioned are unsubstituted or have one or two substituents selected from among halogen, CN, $C_1$-$C_6$-alkyl, $C_1$-$C_6$-alkoxy and phenyl. In particular, Ar and Ar' are furyl which optionally has one or two substituents selected from among halogen, CN, $C_1$-$C_6$-alkyl, $C_1$-$C_6$-alkoxy and phenyl and is in particular unsubstituted (formula Va). In formula VIa, m is 0, 1 or 2 and in particular 0, and R is selected from among halogen, CN, $C_1$-$C_6$-alkyl, $C_1$-$C_6$-alkoxy and phenyl and especially from among methyl and methoxy. In the formulae VI and VIa, $R^c$ and $R^d$ are in particular $C_1$-$C_6$-alkyl and especially methyl. An example of a monomer of the formula VI or VIa is bis(furfuryloxy)dimethylsilane (compound of the formula VIa in which M=Si, q=1, m=0, $R^a$=$R^b$=hydrogen, $R^c$=$R^d$=methyl). Such monomers are known from the prior art, e.g. from the abovementioned article by Spange et al. and the references cited therein, or can be prepared in an analogous way.

Further compounds suitable for producing the materials of the invention are aromatic compounds which have on average at least two trialkylsiloxymethyl groups and/or aryldialkylsiloxymethyl groups bound to identical or different aryl groups, in particular to phenyl rings. In this context, alkyl is alkyl having from 1 to 4 carbon atoms, in particular methyl or ethyl. In this context, aryl is phenyl or naphthyl, in particular phenyl. An example of a trialkylsiloxymethyl group is trimethylsiloxymethyl (($H_3C$)$_3$Si—O—$CH_2$—). An example of an aryldialkylsiloxymethyl group is dimethylphenylsilyloxymethyl (phenyl($H_3C$)$_2$Si—O—$CH_2$—). Here, the aryl ring to which the trialkylsiloxymethyl groups and/or aryldialkylsiloxymethyl groups are bound can have further substituents, for example $C_1$-$C_4$-alkoxy such as methoxy, $C_1$-$C_4$-alkyl, trialkylsilyloxy or aryldialkylsilyloxy. In particular, such twin monomers are phenol compounds which have at least two trialkylsilyloxymethyl groups and/or aryldialkylsilyloxymethyl groups bound to phenyl rings of the phenolic compound, with the OH groups of the phenolic compounds being able to be etherified, in particular by trialkylsilyl groups and/or aryldialkylsilyl groups. Such compounds can be prepared by hydroxymethylation of aromatic compounds, in particular of phenolic compounds, and subsequent reaction with trialkylhalosilanes or with aryldialkylhalosilanes, where in the case of phenolic starting materials not only the hydroxymethyl groups but also the phenolic OH groups are converted into the corresponding silyl ethers. Examples of aromatic compounds are, in particular, phenolic compounds such as phenol, cresols and bisphenol A (=2,2-bis-(4-hydroxyphenyl)propane. The abovementioned aromatic compounds which have on average at least two trialkylsilyloxymethyl groups and/or aryldialkylsilyloxymethyl groups bound to identical or different aryl groups, in particular to phenol rings, can be copolymerized with one another. In this case, compounds which differ in respect of the parent aromatics would be selected. The aromatic compounds which have on average at least two trialkylsilyloxymethyl groups and/or aryldialkylsilyloxymethyl groups bound to identical or different aryl groups, in particular to phenyl rings, are preferably copolymerized together with the monomers of the formula II, IIa, II' or IIa' or with the compounds of the formula IV or V or Va.

In a preferred embodiment of the invention, the monomer of the formula I which is to be polymerized comprises at least one monomer of the formula II, in particular a monomer of the formula IIa, in which the variables have the abovementioned meanings and in particular the meanings indicated as preferred. In particular, the monomer of the formula II forms the main constituent of the monomers to be polymerized, preferably at least 90% by weight. In particular, the monomer of the formula II and especially that of the formula IIa is the sole monomer.

In a likewise preferred embodiment of the invention, the monomer of the formula I comprises a first monomer and at least one second monomer which is different from the first monomer, i.e. in the nature of the atom M or in at least one of the radicals $R^1$, $R^2$, $XR^{1'}$ and/or $YR^{2'}$. In particular, the monomers to be polymerized then comprise at least one monomer of the formula II, in particular a monomer of the formula IIa, and a monomer which is different therefrom and is preferably selected from among monomers of the formulae II and IIa which differ from the first monomer of the formula II or IIa in the metal atom and also among monomers of the formulae II', IIa', III, IIIa, IV, V, Va, VI and VIa. In this case, the monomer weight ratio of the monomer of the formula II or IIa to the further monomer or monomers is generally in the range from 10:1 to 1:10.

In the polymerization of the monomers of the formula I and accordingly also in the polymerization of the monomers of the formulae II, IIa, III, IIIa, IV, V, Va, VI and VIa, the radicals $R^1$ and $R^2$ or the parts of the molecule corresponding to the radicals $R^1$ and $R^2$ and also in the case of X=Y=O the radicals $R^{1'}$ and $R^{2'}$ or the parts of the molecule corresponding to the radicals $R^{1'}$ and $R^{2'}$ form the second, organic polymeric material, while the (semi)metal atom M together with part of the oxygen atoms and, when X and Y represent a bond, the radicals $XR^{1'}$ and $YR^{2'}$ forms the first polymeric material.

The polymerization of the monomers I can be carried out in a manner analogous to the methods known in the prior art and is in particular carried out with protic catalysis or in the presence of aprotic Lewis acids. Preferred catalysts here are Brönsted acids, for example organic carboxylic acids such as trifluoroacetic acid or lactic acid and also organic sulfonic acids such as methanesulfonic acid, trifluoromethanesulfonic acid or toluenesulfonic acid. Inorganic Brönsted acids such as HCl, $H_2SO_4$ or $HClO_4$ are likewise suitable. As Lewis acid, it is possible to use, for example, $BF_3$, $BCl_3$, $SnCl_4$, $TiCl_4$ or $AlCl_3$. The use of complexed Lewis acids or Lewis acids dissolved in ionic liquids is also possible. The acid is usually used in an amount of from 0.1 to 10% by weight, preferably from 0.5 to 5% by weight, based on the monomer.

The polymerization can be carried out in bulk or preferably in an inert diluent. Suitable diluents are, for example, halogenated hydrocarbons such as dichloromethane, trichloromethane, dichloroethene or hydrocarbons such as toluene, xylene or hexane and mixtures thereof.

The polymerization of the monomers of the formula I is preferably carried out in the substantial absence of water, i.e. the concentration of water at the beginning of the polymerization is less than 0.1% by weight. Accordingly, monomers which do not eliminate water under polymerization conditions are preferred as monomers of the formula I. Such monomers include, in particular, the monomers of the formulae II, IIa, III and IIIa.

The polymerization temperature is usually in the range from 0 to 150° C., in particular in the range from 20 to 100° C.

The polymerization of the monomers of the formula I can be followed by purification steps and optionally drying steps.

The polymerization in step i) of the process of the invention is followed by a calcination. Here, the organic polymeric material formed in the polymerization of the monomers of the formula I (or the monomers of the formulae II, IIa, III, IIIa, IV, V, Va, VI and/or VIa) is carbonized to give the carbon phase.

In general, the calcination is carried out at a temperature in the range from 400 to 1500° C., in particular in the range from 500 to 1100° C.

The calcination is then usually carried out with substantial exclusion of oxygen. In other words, the oxygen partial pressure in the reaction zone in which the calcination is carried out is low during the calcination and will preferably not exceed 20 mbar, in particular 10 mbar. The calcination is preferably carried out in an inert gas atmosphere, e.g. under nitrogen or argon. The inert gas atmosphere will preferably comprise less than 1% by volume, in particular less than 0.1% by volume, of oxygen. In a likewise preferred embodiment of the invention, the calcination is carried out under reducing conditions, e.g. in an atmosphere comprising hydrogen ($H_2$), hydrocarbon gases such as methane, ethane or propane or ammonia ($NH_3$), optionally as a mixture with an inert gas such as nitrogen or argon.

To remove volatile constituents, the calcination can be carried out in a stream of inert gas or in a gas stream comprising reducing gases such as hydrogen, hydrocarbon gases or ammonia.

The material of the invention has, as already stated, particularly advantageous properties when used in lithium ion cells, in particular a high specific capacity, good cycling stability, a low tendency for spontaneous discharge to occur and for lithium dendrites to be formed and also advantageous kinetics in respect of the charging/discharge process, so that high current densities can be achieved.

The invention therefore also provides for the use of the electroactive material in anodes for lithium ion cells, in particular lithium ion secondary cells, and also provides an anode for lithium ion cells, in particular lithium ion secondary cells, which comprises an electroactive material according to the invention.

Apart from the electroactive material of the invention, the anode generally comprises at least one suitable binder for strengthening the electroactive material of the invention and optionally further electrically conductive or electroactive constituents. In addition, the anode generally has electrical contacts for input and output of charges. The amount of electroactive material according to the invention, based on the total mass of the anode material minus any current collectors and electrical contacts, is generally at least 40% by weight, frequently at least 50% by weight and especially at least 60% by weight.

Possible further electrically conductive or electroactive constituents in the anodes of the invention are carbon black, graphite, carbon fibers, carbon nanofibers, carbon nanotubes or electrically conductive polymers. Typically, from about 2.5 to 40% by weight of the conductive material together with from 50 to 97.5% by weight, frequently with from 60 to 95% by weight, of the electroactive material of the invention are used in the anode, with the percentages by weight being based on the total mass of the anode material minus any current collectors and electrical contacts.

Possible binders for production of an anode using the electroactive materials of the invention are, in particular, the following polymeric materials:

Polyethylene oxide (PEO), cellulose, carboxymethylcellulose (CMC), polyethylene, polypropylene, polytetrafluoroethylene, polyacrylonitrile-methyl methacrylate, polytetrafluoroethylene, styrene-butadiene copolymers, tetrafluoroethylene-hexafluoroethylene copolymers, polyvinylidene difluoride (PVdF), polyvinylidene difluoride-hexafluoropropylene copolymers (PVdF-HFP), tetrafluoroethylene-hexafluoropropylene copolymers, perfluoroalkyl-vinyl ether copolymers, vinylidene fluoride-hexafluoropropylene copolymers, ethylene-tetrafluoroethylene copolymers, vinylidene fluoride-chlorotrifluoroethylene copolymers, ethylene-chlorofluoroethylene copolymers, ethylene-acrylic acid copolymers (with and without inclusion of sodium ions), ethylene-methacrylic acid copolymers (with and without inclusion of sodium ions), ethylene-methacrylic ester copolymers (with and without inclusion of sodium ions), polyimides and polyisobutene.

The choice of the binder is optionally made taking into account the properties of any solvent used for the production process. The binder is generally used in an amount of from 1 to 10% by weight, based on the total mixture of anode material. Preference is given to using from 2 to 8% by weight, in particular from 3 to 7% by weight.

The anode can be produced in a manner which is customary per se by standard processes which are known from the prior art cited above and also from relevant monographs. For example, the anode can be produced by mixing the electroactive material of the invention, optionally using an organic solvent (for example N-methylpyrrolidinone or a hydrocarbon solvent) with the further optional constituents of the anode material (electrically conductive constituents and/or organic binder) and optionally subjecting the mixture to a shaping process or applying it to an inert metal foil, e.g. Cu foil. Drying is then optionally carried out. A temperature of, for example, from 80 to 150° C. is used here. The drying process can also take place under reduced pressure and generally takes from 3 to 48 hours. A melting or sintering process can also optionally be employed for shaping.

The present invention additionally provides lithium ion cells, in particular a lithium ion secondary cell, which have at least one anode comprising an electroactive material according to the invention.

Such cells generally comprise at least one anode according to the invention, a cathode suitable for lithium ion cells, an electrolyte and optionally a separator.

As regards suitable cathode materials, suitable electrolytes, suitable separators and possible arrangements, reference may be made to the relevant prior art, e.g. to the prior art cited above and appropriate monographs and reference works: e.g. Wakihara et al. (editor) in *Lithiumion Batteries*, 1st edition, Wiley VCH, Weinheim, 1998; David Linden: *Handbook of Batteries* (McGraw-Hill Handbooks), 3rd edition, McGraw-Hill Professional, New York 2008; J. O. Besenhard: *Handbook of Battery Materials*. Wiley-VCH, 1998.

Possible cathodes are, in particular, cathodes in which the cathode material comprises lithium-transition metal oxide, e.g. lithium-cobalt oxide, lithium-nickel oxide, lithium-cobalt-nickel oxide, lithium-manganese oxide (spinel), lithium-nickel-cobalt-aluminum oxide, lithium-nickel-cobalt-manganese oxide or lithium-vanadium oxide, or a lithium-transition metal phosphate such as lithium-iron phosphate.

The two electrodes, i.e. the anode and the cathode, are connected to one another using a liquid or solid electrolyte. Possible liquid electrolytes are, in particular, nonaqueous solutions (water content generally <20 ppm) of lithium salts and molten Li salts, e.g. solutions of lithium hexafluorophosphate, lithium perchlorate, lithium hexafluoroarsenate, lithium trifluoromethylsulfonate, lithium bis(trifluoromethyl-sulfonyl)imide or lithium tetrafluoroborate, in particular lithium hexafluorophosphate or lithium tetrafluoroborate, in suitable aprotic solvents such as ethylene carbonate, propylene carbonate and mixtures of these with one or more of the following solvents: dimethyl carbonate, diethyl carbonate, dimethoxyethane, methyl propionate, ethyl propionate, butyrolactone, acetonitrile, ethyl acetate, methyl acetate, toluene and xylene, especially in a mixture of ethylene carbonate and diethyl carbonate. As solid electrolytes, it is possible to use, for example, ionically conductive polymers.

A separator impregnated with the liquid electrolyte can be arranged between the electrodes. Examples of separators are, in particular, fiberglass nonwovens and porous organic polymer films such as porous films of polyethylene, polypropylene, PVdF, etc.

These can, for example, have a prismatic thin film structure in which a solid thin film electrolyte is arranged between a film which represents an anode and a film which represents a cathode. A central cathode current collector is arranged between each of the cathode films to form a double-sided cell configuration. In another embodiment, a single-sided cell configuration in which a single cathode current collector is assigned to a single anode/separator/cathode element combination can be used. In this configuration, an insulating film is typically arranged between individual anode/separator/cathode/current collector element combinations.

The following figures and examples illustrate the invention and are not to be construed as constituting a restriction.

The TEM studies by the HAADF-STEM method were carried out using a Tecnai F20 transmission electron microscope (FEI, Eindhoven, NL) at a working voltage of 200 kV using the ultrathin layer technique (embedding of the samples in synthetic resin as matrix).

The ESCA studies were carried out using an FEI 5500 LS X-ray photoelectron spectrometer from FEI (Eindhoven, NL).

The small angle X-ray scattering studies were carried out at 20° C. with slit collimation using $Cu_{K\alpha}$ radiation monochromatized by means of Göbel mirrors. The data were corrected for background and sharpened in respect of the blurring caused by the slit collimation.

Figure 1:
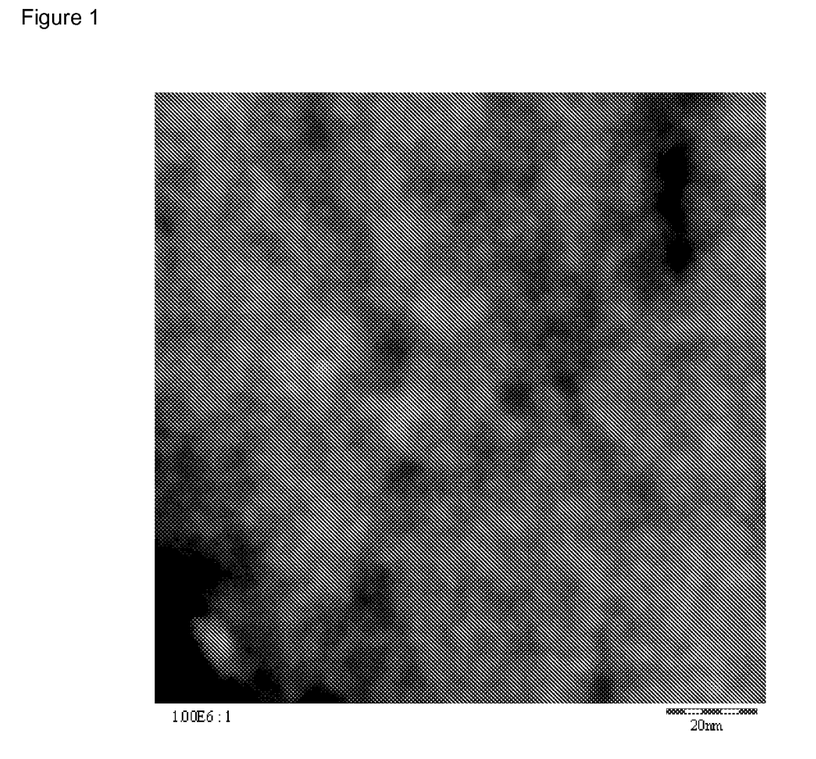
FIG. 1 is a HAADF-STEM examination of the sample from example 1 at a magnification of 106.

FIG. 1: HAADF-STEM examination of the sample from example 1 at a magnification of $10^6$.

Figure 2:
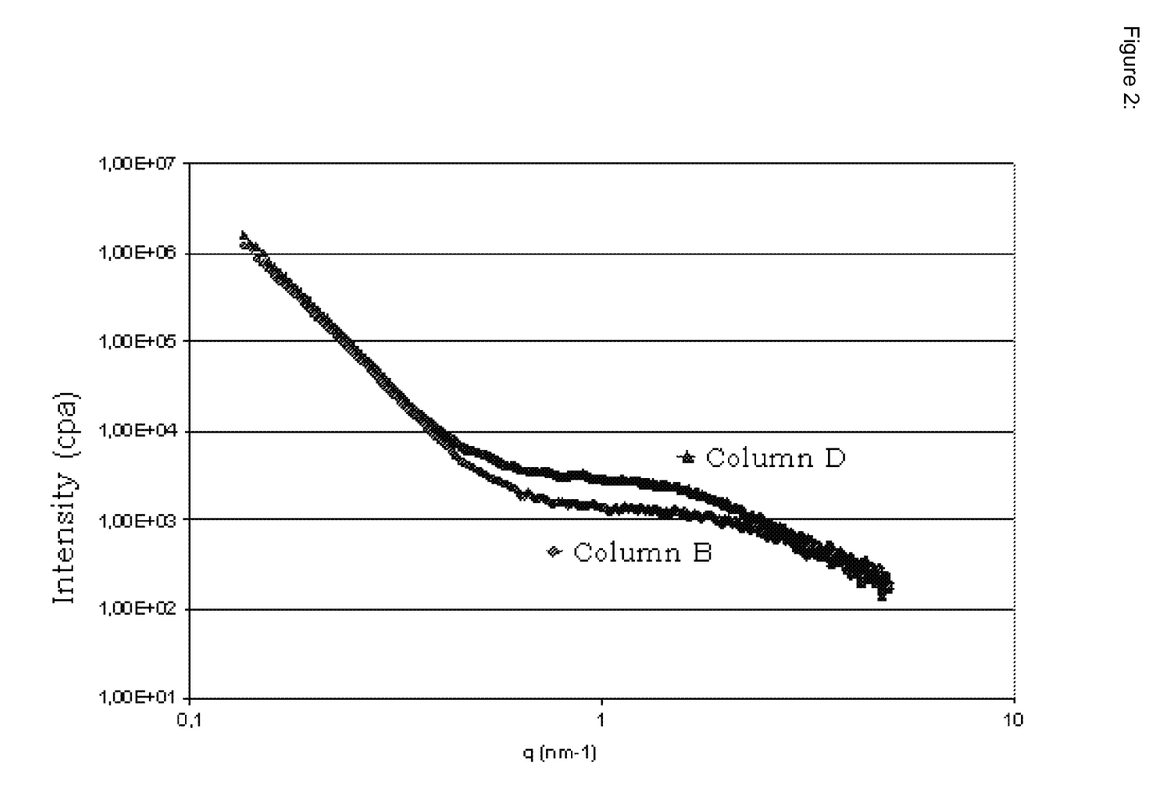
FIG. 2 depicts the result of the SWAXS study (transmission of the samples from example 1 (column D) and 2 (column B), shown as scattering intensity as a function of the scattering vector q, after correction and sharpening.

FIG. 2: Result of the SWAXS study (transmission of the samples from example 1 (column D) and 2 (column B), shown as scattering intensity as a function of the scattering vector q, after correction and sharpening.

Figure 3:
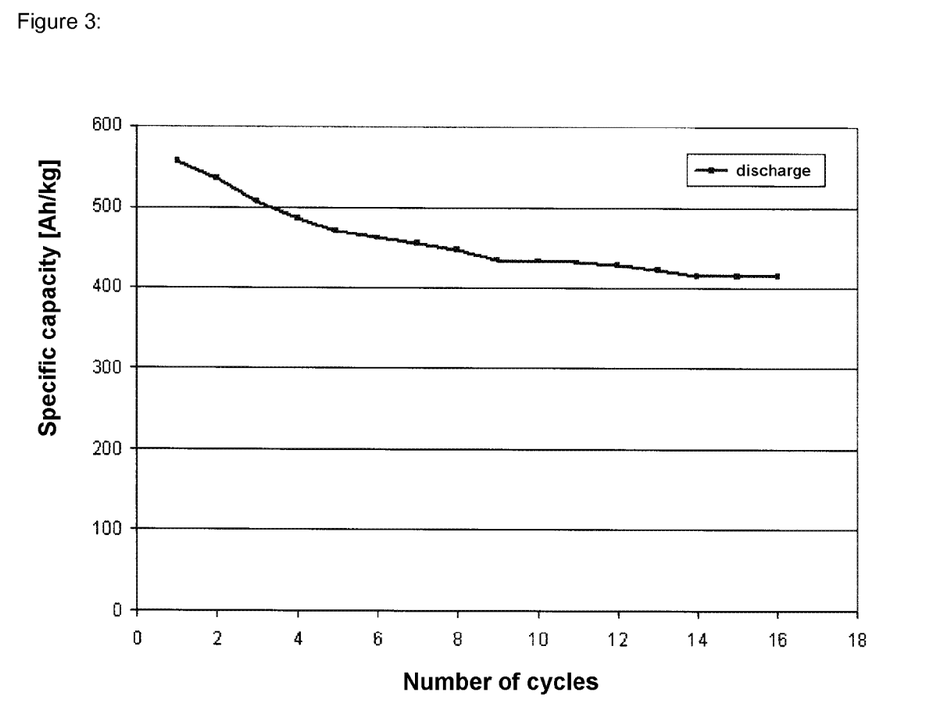
FIG. 3 is a graph of the capacity of the electrode material from example 1 as a function of the number of cycles.

FIG. 3: Graph of the capacity of the electrode material from example 1 as a function of the number of cycles.

Preparative Example 1

2,2'-spirobis[4H-1,3,2-benzodioxasilin]

135.77 g of salicyl alcohol (1.0937 mol) were dissolved in toluene at 85° C. 83.24 g (0.5469 mol) of tetramethoxysilane (TMOS) were then slowly added dropwise, with 0.3 ml of tetra-n-butylammonium fluoride (1 M in THF) being added all at once by means of a syringe after addition of one third of the TMOS. The mixture was stirred at 85° C. for 1 hour and the methanol/toluene azeotrope was subsequently distilled off (63.7° C.). The remaining toluene was removed on a rotary evaporator. The product was leached from the resulting reaction mixture by means of hexane at ≈70° C. After cooling to 20° C., the clear solution was decanted off. Removal of the hexane left the title compound as a white solid. The product can be purified further by reprecipitation with hexane.

$^1$H-NMR (400 MHz, CDCl$_3$, 25° C., TMS) δ [ppm]=5.21 (m, 4H, CH$_2$), 6.97-7.05 (m, 6H), 7.21-7.27 (M, 2H).

$^{13}$C-NMR (100 MHz, CDCl$_3$, 25° C.): δ [ppm]=66.3 (CH$_2$), 119.3, 122.3, 125.2, 125.7, 129.1, 152.4.

$^{29}$Si-CP-MAS (79.5 MHz): δ [ppm]=−78.4

Example 1

Production of the Electroactive Material 1) 65 g of 2,2'-spirobi[4H-1,3,2-benzodioxasilin] were dissolved in 500 ml of trichloromethane. The reaction vessel was made inert by means of nitrogen and the polymerization was started by addition of 5 g of methanesulfonic acid at 23° C. The reaction mixture was allowed to react for a further one hour at 23° C. and the polymer was filtered off. The polymer obtained in this way was dried to constant weight at 50° C. in a vacuum drying oven.

2) The powder obtained in step 1 was subsequently calcined at 600° C. in a stream of nitrogen for 2 hours in a tube furnace. This gave a black powder.

According to elemental analysis, the powder had a carbon content of 56.1% by weight and a silicon content of 15.4% by weight.

According to ESCA, the silicon was present essentially as silicon dioxide (signal at 103.3 eV). The carbon was present essentially as graphite (asymmetric signal at 284.5 eV).

According to SWAXS, the average spacing of the phases was less than 1 nm (see FIG. 2).

The homogeneously dispersed regions of the SiOx domains can be seen in the transmission electron micrograph (FIG. 1). The size of these domains is in the range 0.2-5 nm.

Example 2

Production of the Electroactive Material

The powder obtained in step 1 was subsequently calcined at 800° C. in a stream of nitrogen for 2 hours in a tube furnace. This gave a black powder.

According to elemental analysis, the powder had a carbon content of 55.9% by weight and a silicon content of 16.6% by weight.

According to ESCA, the silicon was present essentially as silicon dioxide. The carbon was present essentially as graphite.

According to SWAXS, the average spacing of the phases was less than 1 nm.

Example 3

Production of the Electroactive Material

The powder obtained in step 1 was subsequently calcined at 1000° C. in a stream of argon for 2 hours in a tube furnace. This gave a black powder.

According to elemental analysis, the powder had a carbon content of 60.5% by weight and a silicon content of 16.3% by weight.

Example 4

Production of the Electroactive Material

The powder obtained in step 1 was subsequently calcined at 1000° C. in a stream of hydrogen for 2 hours in a tube furnace. This gave a black powder.

According to elemental analysis, the powder had a carbon content of 60.8% by weight and a silicon content of 15.7% by weight.

Example 5

Production of an Anode

To produce an anode, 5 g of the powder produced in example 1 was mixed with 5 g of carbon black (Super P®, from Timcal AG, 6743 Bodio, Switzerland), 16.4 g of acetonitrile and 0.3 g of a commercial PVdF-HFP copolymer for 30 seconds by means of a high-speed stirrer (Ultra-Turrax® T25 basic, from IKA Labortechnik, D-79219 Staufen).

The black suspension obtained was degassed on a roller machine in a closed glass vessel and subsequently applied in a layer thickness of 250 μm to an aluminum foil by means of a doctor blade. After drying at 80° C. in a vacuum drying oven for 1 hour, the applied layer thickness was 80 μm. Electrodes having a diameter of 13 mm were stamped from the resulting anode material and, under argon (content of oxygen and water vapor in each case <1 ppm) in a glove box, installed in cells for electrochemical characterization.

Metallic lithium plates stamped out of a 750 μm thick Li foil (from Sigma-Aldrich Chemie GmbH, CH-9571 Buchs SG, Switzerland) were used as cathode.

A fiberglass nonwoven having a thickness of about 1 mm was used as separator and a mixture of dimethyl carbonate and ethylene carbonate in a ratio of 1:1 having a content of 1 mol/l of lithium hexafluorophosphate $LiPF_6$ (manufacturer: Ferro Corp., Cleveland, USA) was used as electrolyte solution.

To test the stability, the cell is installed in a measuring unit for electrochemical characterization and cycled using the following parameters: discharge at 10 mA/g; cell voltage cycled from 0 to 2.0 V. The capacity as a function of the number of cycles is shown in FIG. 3.

The invention claimed is:

1. An electroactive material comprising:
a) a carbon phase C;
b) at least one $MO_x$ phase, where M is a metal or semimetal, x is from 0 to ≤k/2, where k is the maximum valence of the metal or semimetal;
wherein the carbon phase C and the $MO_x$ phase form essentially co-continuous phase domains, with the average distance between two neighboring domains of identical phases being not more than 10 nm.

2. The electroactive material according to claim 1, wherein M is selected from among B, Al, Si, Ti, Zr, Sn, Sb and mixtures thereof.

3. The electroactive material according to claim 1, wherein at least 90 mol % of M, based on the total amount of M, is Si.

4. The electroactive material according to claim 1, wherein x is in the range from 0 to 2.

5. The electroactive material according claim 1, wherein the carbon phase C has a molar ratio of hydrogen to carbon of not more than 0.5.

6. The electroactive material according to claim 1, wherein the molar ratio of semimetal or metal M to carbon phase C is in the range from 1:30 to 1:1.

7. The electroactive material according to claim 1, wherein the regions in which the carbon phase and the $MO_x$ phase form essentially co-continuous phase domains make up at least 80% of the electroactive material.

8. The electroactive material according to claim 1 which can be obtained by a process comprising the following steps:
i) polymerization of at least one monomer of the formula I in a nonaqueous polymerization medium (I)

where
M is a metal or semimetal;
$R^1$, $R^2$ can be identical or different and are each a radical Ar—$C(R^a,R^b)$—, where Ar is an aromatic or heteroaromatic ring which optionally has one or two substituents selected from among halogen, CN, $C_1$-$C_6$-alkyl, $C_1$-$C_6$-alkoxy and phenyl and $R^a$, $R^b$ are each, independently of one another, hydrogen or methyl or together represent an oxygen atom or a methylidene group (=$CH_2$),
or the radicals $R^1O$ and $R^2Q$ form a radical of the formula A (A)

where A is an aromatic or heteroaromatic ring fused to the double bond, m is 0, 1 or 2, the radicals R can be identical or different and are selected from among halogen, CN, $C_1$-$C_6$-alkyl, $C_1$-$C_6$-alkoxy and phenyl and $R^a$, $R^b$ are as defined above;
Q is o, S or NH;
q is 0, 1 or 2 corresponding to the valence of M,
X, Y can be identical or different and are each O, S, NH or a chemical bond;
$R^{1'}$, $R^{2'}$ can be identical or different and are each $C_1$-$C_6$-alkyl, $C_3$-$C_6$-cycloalkyl, aryl or a radical Ar'—$C(R^{a'},R^{b'})$—, where Ar' has the meanings given for Ar and $R^{a'}$, $R^{b'}$ have the meanings given for $R^a$, $R^b$ or $R^{1'}$, $R^{2'}$ together with X and Y form a radical of the formula A as defined above,
and
ii) calcination of the resulting polymer with substantial or complete exclusion of oxygen.

9. The electroactive material according to claim 8, wherein the monomer of the formula I comprises at least one monomer of the formula II:

(II)

where
M is a metal or semimetal;
A and A' are each an aromatic or heteroaromatic ring fused to the double bond;
m and n are each, independently of one another, 0, 1 or 2;
Q and Q' are identical or different and are each, independently of one another, O, S or NH;
R and R' are identical or different and are selected independently from among halogen, CN, $C_1$-$C_6$-alkyl, $C_1$-$C_6$-alkoxy and phenyl; and
$R^a$, $R^b$, $R^{a'}$, $R^{b'}$ are selected independently from among hydrogen and methyl or $R^a$ and $R^b$ and/or $R^{a'}$ and $R^{b'}$ in each case together represent an oxygen atom.

10. The electroactive material according to claim 8, wherein the calcination is carried out at a temperature in the range from 400 to 1500° C. in an essentially oxygen-free atmosphere.

11. A process for producing an electroactive material, which comprises the following steps:
   i) polymerization of at least one monomer of the formula I as defined in claim 8 in a nonaqueous polymerization medium and
   ii) calcination of the resulting polymer with substantial or complete exclusion of oxygen.

12. The process according to claim 11, wherein the monomer of the formula I comprises at least one monomer of the formula II as defined in claim 9.

13. The process according to claim 11, wherein the calcination is carried out at a temperature in the range from 400 to 1500° C. in an essentially oxygen-free atmosphere.

14. An anode for lithium ion cells, which comprises at least one electroactive material according to claim 1.

15. A lithium ion cell comprising at least one anode according to claim 14.

* * * * *